US010935064B2

(12) United States Patent
Miller

(10) Patent No.: US 10,935,064 B2
(45) Date of Patent: Mar. 2, 2021

(54) DOWEL WITH DIRECTIONAL EXPANDING PORTION AND WALL SYSTEM INCLUDING DIRECTIONAL DOWEL

(71) Applicant: Miller Dowel Company, Wilmette, IL (US)

(72) Inventor: Michael R. Miller, Winnetka, IL (US)

(73) Assignee: MILLER DOWEL COMPANY, Wilmette, IL (US)

( * ) Notice: Subject to any disclaimer, the term of this patent is extended or adjusted under 35 U.S.C. 154(b) by 0 days.

(21) Appl. No.: 16/842,450

(22) Filed: Apr. 7, 2020

(65) Prior Publication Data

US 2020/0332817 A1   Oct. 22, 2020

Related U.S. Application Data

(60) Provisional application No. 62/836,219, filed on Apr. 19, 2019.

(51) Int. Cl.
*F16B 13/04* (2006.01)
*F16B 13/02* (2006.01)

(52) U.S. Cl.
CPC .............. *F16B 13/04* (2013.01); *F16B 13/02* (2013.01)

(58) Field of Classification Search
CPC ........ F16B 13/04; F16B 13/02; F16B 13/141; F16B 2013/10; F16B 19/02; F16B 19/002;
(Continued)

(56) References Cited

U.S. PATENT DOCUMENTS

RE13,915 E   5/1915  Evans
1,229,565 A  6/1917  Ahlgren
(Continued)

FOREIGN PATENT DOCUMENTS

EP   1 396 462 A2   3/2004
WO   93/02263       2/1993

OTHER PUBLICATIONS

NPL#1: Dowel Wood Grain, Wonkee Donkee Tools, Mar. 19, 2016, <https://web.archive.org/web/20160319041242/https://www.wonkeedonkeetools.co.uk/dowels/how-does-grain-affect-the-strength-of-dowels> (Year: 2016).*

(Continued)

*Primary Examiner* — Victor D Batson
*Assistant Examiner* — Amit Singh Dhillon
(74) *Attorney, Agent, or Firm* — Husch Blackwell LLP

(57) ABSTRACT

Dowels harvested from wood including portions from adjacent growth rings that are oriented so that the dowels expand in a horizontal direction, relative to its longitudinal axis, when exposed to moisture. Assembly systems can incorporate the dowels as fasteners, dowels and the assembly systems marked to allow for orienting the dowels for expansion in a predetermined direction relative to the assembly system. Wall systems made of contiguous wall panels assembled with dowels, where the dowel paths are arranged in configurations for stabilizing the assembled wall system. The wall panel tops can include pairs of dowel paths angled toward each other. The central wall panel bottoms can include a dowel path along a longitudinal axis, while the flanking wall panel bottoms can include dowel paths extending toward the central wall panel. The wall system can include the markings for orienting marked and directionally-expanding dowels.

7 Claims, 9 Drawing Sheets

(58) Field of Classification Search
CPC ...... F16B 19/004; F16B 15/04; F16B 1/0071;
E04B 1/48; B32B 3/00; B32B 21/00
USPC .................................. 411/351, 19; 403/297
See application file for complete search history.

(56) References Cited

U.S. PATENT DOCUMENTS

| | | | |
|---|---|---|---|
| 2,621,006 | A | 7/1948 | Norrefeldt et al. |
| 2,667,795 | A | 2/1954 | Bowen |
| 2,817,620 | A | 12/1957 | Golick et al. |
| 3,016,222 | A | 1/1962 | Arthur |
| 3,104,430 | A | 9/1963 | Badali |
| 3,153,283 | A | 10/1964 | Weissman |
| 3,204,583 | A | 9/1965 | Nicholson |
| 3,221,458 | A | 12/1965 | Lucas |
| 3,527,486 | A | 9/1970 | Gamp |
| 3,550,244 | A * | 12/1970 | Utzy ..................... F16B 1/0071 29/407.05 |
| 3,575,520 | A | 4/1971 | Halpern |
| 3,582,126 | A | 6/1971 | Bladholm |
| 3,635,573 | A | 1/1972 | Halpern |
| 3,756,635 | A | 9/1973 | Beers |
| 3,850,054 | A | 11/1974 | Weissman |
| 3,883,258 | A | 5/1975 | Hewson |
| 4,093,389 | A | 6/1978 | Wibrow |
| 4,128,356 | A | 12/1978 | Carlisle |
| 4,137,115 | A | 1/1979 | Lambert |
| 4,340,327 | A | 7/1982 | Martins |
| 4,424,753 | A | 1/1984 | Eatherton |
| 4,518,291 | A | 5/1985 | Lang et al. |
| 4,536,044 | A | 8/1985 | Ziegelheim et al. |
| 4,639,197 | A | 1/1987 | Tonare et al. |
| 4,793,745 | A | 12/1988 | Ashbaugh et al. |
| 4,815,902 | A | 3/1989 | Durfee, Jr. |
| 4,884,571 | A | 12/1989 | Baker |
| 5,100,162 | A | 3/1992 | Lo |
| 5,131,783 | A | 7/1992 | Astl |
| 5,213,456 | A * | 5/1993 | Lee ..................... B23B 51/0406 408/203.5 |
| 5,232,302 | A | 8/1993 | Wagner et al. |
| 5,265,988 | A | 11/1993 | Schmigalla et al. |
| 5,326,196 | A | 7/1994 | Noll |
| 5,333,555 | A | 8/1994 | McPhee |
| 5,458,069 | A | 10/1995 | Stolzman |
| 5,529,424 | A | 6/1996 | Neubert et al. |
| D371,302 | S | 7/1996 | Spirer |
| 5,584,951 | A | 12/1996 | Macfarland |
| 5,673,629 | A | 10/1997 | Ginnow |
| 5,685,234 | A | 11/1997 | Grigsby et al. |
| 5,768,845 | A | 6/1998 | Beaulieu et al. |
| 5,771,650 | A | 6/1998 | Williams et al. |
| 5,807,015 | A | 9/1998 | Goto |
| 5,960,721 | A | 10/1999 | Huettemann et al. |
| 5,967,056 | A | 10/1999 | Plante |
| D426,766 | S | 6/2000 | Burchall et al. |
| 6,267,527 | B1 | 7/2001 | Miller |
| D456,700 | S | 5/2002 | Miller et al. |
| D484,781 | S | 1/2004 | Miller |
| 6,814,287 | B1 | 11/2004 | Chang et al. |
| 6,871,681 | B2 | 3/2005 | Miller |
| 7,856,933 | B2 | 12/2010 | Miller et al. |
| 10,005,586 | B1 | 6/2018 | Miller |
| 2003/0089771 | A1 | 5/2003 | Cybulski et al. |
| 2004/0099339 | A1 | 5/2004 | Miller |
| 2006/0054064 | A1 | 3/2006 | Miller et al. |
| 2008/0115699 | A1 | 5/2008 | Miller et al. |
| 2008/0245030 | A1 | 10/2008 | Sieber |
| 2009/0149285 | A1 * | 6/2009 | Miller ..................... A63B 59/52 473/564 |
| 2009/0255605 | A1 | 10/2009 | Filion et al. |
| 2010/0199891 | A1 * | 8/2010 | Miller ................ B65D 19/0091 108/57.17 |
| 2013/0020819 | A1 | 1/2013 | Alba |
| 2015/0210425 | A1 * | 7/2015 | Miller ................ B65D 19/0095 108/57.17 |

OTHER PUBLICATIONS

Search Report and Written Opinion of the International Searching Authority for corresponding PCT application PCT/US2020/037761 dated Aug. 20, 2020.
Search Report and Written Opinion of the International Searching Authority for corresponding PCT application PCT/US2020/029891 dated Jul. 9, 2020.
Udo Schmidt, Predicting Wood Movement, Woodcraft Magazine, Issue 13, pp. 76-76, 100206, https://www.woodcraft.com/media/W1siZilsljlwMTgvMTAvMjMvMTAvMDYvNDQvNDI5L1dvb2R TZW5zZTIucGRmIl1d/WoodSense2.pdf?sha=169d863a947fc7cb.
Nick Engler, Wood MOvement, Workshop Companion, 2009, http://workshopcompanion.com/KnowHow/Design/Nature_of_Wood/2_Wood_Movement/2_Wood-Movement.htm.
Jeff Lefkowitz, Grain Orientation and Wood Movement, Part 1: Chairmaking Techniques, 101112, http://www.jefflefkowitzchairmaker.com/chairmakers-journal/grain-orientation-and-wood-movement-part-1.
Udo Schmidt, Predicting Wood Movement, Woodcraft Magazine, Issue 13, pp. 73-76, 100206, https://www.woodcraft.com/media/W1siZilsljlwMTgvMTAvMjMvMTAvMDYvNDQvNDI5L1dvb2R TZW5zZTIucGRmll1d/WoodSense2.pdf?sha=169d863a947fc7cb.

* cited by examiner

DOWEL WITH DIRECTIONAL EXPANDING PORTION AND WALL SYSTEM INCLUDING DIRECTIONAL DOWEL

CROSS-REFERENCE TO RELATED APPLICATION

This application claims the benefit of the filing date of U.S. Provisional Application Ser. No. 62/836,219 filed Apr. 19, 2019, entitled, "Dowel With Directional Expanding Portion And Wall System Including Directional Dowel" which is hereby incorporated by reference as if fully set forth herein.

BACKGROUND OF THE INVENTION

Wood expands and contracts when its moisture content changes. When wood fibers absorb moisture, they swell. When wood fibers lose moisture, they shrink. Such wood movement can occur in response to certain environmental changes, especially changes in humidity. Ambient moisture content can also be affected by artificially-induced changes in relative humidity and temperature, such as found in buildings having controlled heating, cooling, and humidity. Wooden items can also encounter moisture as compounds, such as stains and adhesives, applied to wood-containing assemblies such as walls, pallets, and furniture.

Expanding and contracting wood generally does not move equally in all directions. The degree of moisture-related movement a wooden item can experience can be affected by the grain of the wood, the item's shape, and the part of the tree it was harvested from. These characteristics are described in: Udo Schmidt, Predicting Wood Movement, Woodcraft Magazine, Issue 13, pp. 73-76 (Oct. 2, 2006); Nick Engler, Wood Movement, Workshop Companion; Jeff Lefkowitz, Grain Orientation and Wood Movement, Part 1: Chairmaking Techniques; which are all incorporated by reference herein in their entirety. Those factors also affect which portions of the wooden item experience the greatest amounts of movement, as well as the direction of that movement, relative to that wooden item.

A piece of wood that is large enough to encompass portions of multiple adjacent growth rings can be subject to expansion or contraction or movement in multiple planes or axes, but not to equal degrees. For example, in response to changes in moisture content, wood tends to move the least along its longitudinal direction, the up-and-down direction paralleling the core of the tree or branch.

In comparison, wood tends to move more along the plane perpendicular to the tree's longitudinal core. It can move more in the radial direction, going from the core outward, taking the shortest distance between neighboring growth rings in the trunk or branch, in a direction perpendicular to the longitudinal direction. In this same plane, wood can move even more in directions tangential to its growth rings, that is, in the directions of the pathways defined between neighboring growth rings. Such tangential movement can be described as sideward, rather than outward or inward.

As a tree grows, water is transported by the outer portion of the tree, also called the sapwood. Compared to the wood of the inner portion of the tree, the heartwood, the sapwood can absorb more water. Thus, the sapwood can expand and contract to a greater degree than the heartwood, and wooden items obtained from sapwood can experience greater amounts of water-related movement than identically-sized and -shaped items harvested from heartwood.

There is a need for wooden items harvested from specific portions of trees and harvested in specific orientations relative to the tree's grain, so that the finished wooden item can predictably provide the greatest amount of moisture-driven movement in predetermined directions relative to other portions of the wooden item.

There is a need for wooden items that can be used in multi-component assemblies and configured in those assemblies so that the moisture-related expansion forces of the wooden components can be directed into predetermined directions, relative to the rest of the assemblies, in directions suited for absorbing or withstanding such expansion and contraction forces.

Wood products made of layers of wood, such as glue laminated timber, can include laminating multiple layers of wood or lumber together with adhesives. Glue laminated timber (GLT) can be subject to less moisture-related movement than sawed lumber. Other wood products made of layers of wood, such as cross-laminated timber (CLT) is made from gluing sawed pieces of lumber together, with some or all of the layers having the same orientation. CLT is a group of wood panel products that are subject to less moisture-related movement than sawed lumber.

There is also a need for wooden items made from these sources, having portions subject to moisture-related movement in predictable directions and amounts, though the items made from composite woods like GLT or CLT can experience can lesser amounts of movement, compared to simple sawed lumber, for example.

Depending on how a wooden item, such as a plank or a dowel, is cut from a tree, the wooden item can be cut in an orientation so that the direction of the or can be restricted to moving in certain directions. There is a need, for example, for wooden dowels fashioned to expand and contract in a predicted or predetermined direction relative to the longitudinal axis of the dowel. There is also a need for such a dowel having predictable directions and degrees of moisture-related movement, to align the dowel within a dowel-receiving component so that the moisture-related movement of the dowel occurs in directions suitable to maintain a secure connection between the mating components.

When incorporated into certain structures, such wooden items can be oriented to direct the moisture-related forces of movements in a desired direction relative to the structure.

There is also a need for dowels and dowel-receiving structures that are pre-marked to enable an individual to align those items in a predetermined, structurally stable configuration. There is a further need for markings that facilitate alignment of those components by mere visual or tactile inspection, for example, without the need for special tools. There is also a need for a marking system that informs a user as to the size or type of wooden component, such as a dowel, that will fit into a cavity meant to receive that wooden component.

There is also a need for wall systems incorporating such dowels to create a wall system that can remain stable when the dowel expands or contracts in response to changes in moisture content. There is also a need for assembly systems, such as wall systems, employing such dowels in particular configurations within individual components, to orient individual components to buttress each other and to enhance the overall stability of such systems.

BRIEF SUMMARY OF THE INVENTION

The present invention relates to a dowel fashioned to expand and contract in a predetermined direction, particularly movement caused by changes in moisture content. An aspect of the invention relates to a stepped dowel made of wood so that certain portions of the dowel are subject to maximum amounts of moisture-related expansion and contraction.

Another embodiment of the present invention relates to a connection system including a directional dowel and a component such as a board or panel having openings for receiving the directional dowels, wherein the directional dowels and the dowel-receiving portions are marked so as to enable an individual to position the dowel in the board so that the dowel expands and contracts in a preferred direction relative to the component.

Another embodiment of the present invention relates to a method of making the connection system.

Another embodiment of the present invention relates to a wall system made of wall panels and directional dowels, configured to direct maximum dowel movement in preferred directions relative to the wall system. An aspect of the invention relates to a wall system configured so that at such moisture-related movement can be aimed or directed in one or more desired directions relative to components of the wall system.

Another embodiment of the present invention relates to a wall system multiple wall panels having specific configurations of dowel-receiving portions, configured for improving the stability of the wall system. An aspect of the invention relates to a wall system including a central wall panel with one or more flanking wall panels on each side, the different panels having specific configurations of dowel-receiving openings for improving the stability of the wall system.

Another embodiment of the present invention relates to methods of making the wall systems.

BRIEF DESCRIPTION OF THE DRAWINGS

The accompanying drawings illustrate the present invention and together with the description, further serve to explain the principles of the invention and to enable a person skilled in the relevant art to make and use the invention.

These and other features and advantages of the present invention will be apparent from the following detailed description, claims, and accompanying drawings.

FIG. 4A shows a finished, painted or coated dowel. FIG. 4B shows an unfinished wooden dowel, with first and second end portions of the growth ring layers extending to the outer surface of the dowel, and the first end portions facing the viewer. FIG. 4C shows the dowel views of FIG. 4B rotated about 90 degrees about the longitudinal axis of the dowel, so that the first and second end portions extend in a plane substantially perpendicular to the viewer.

Figure 1:
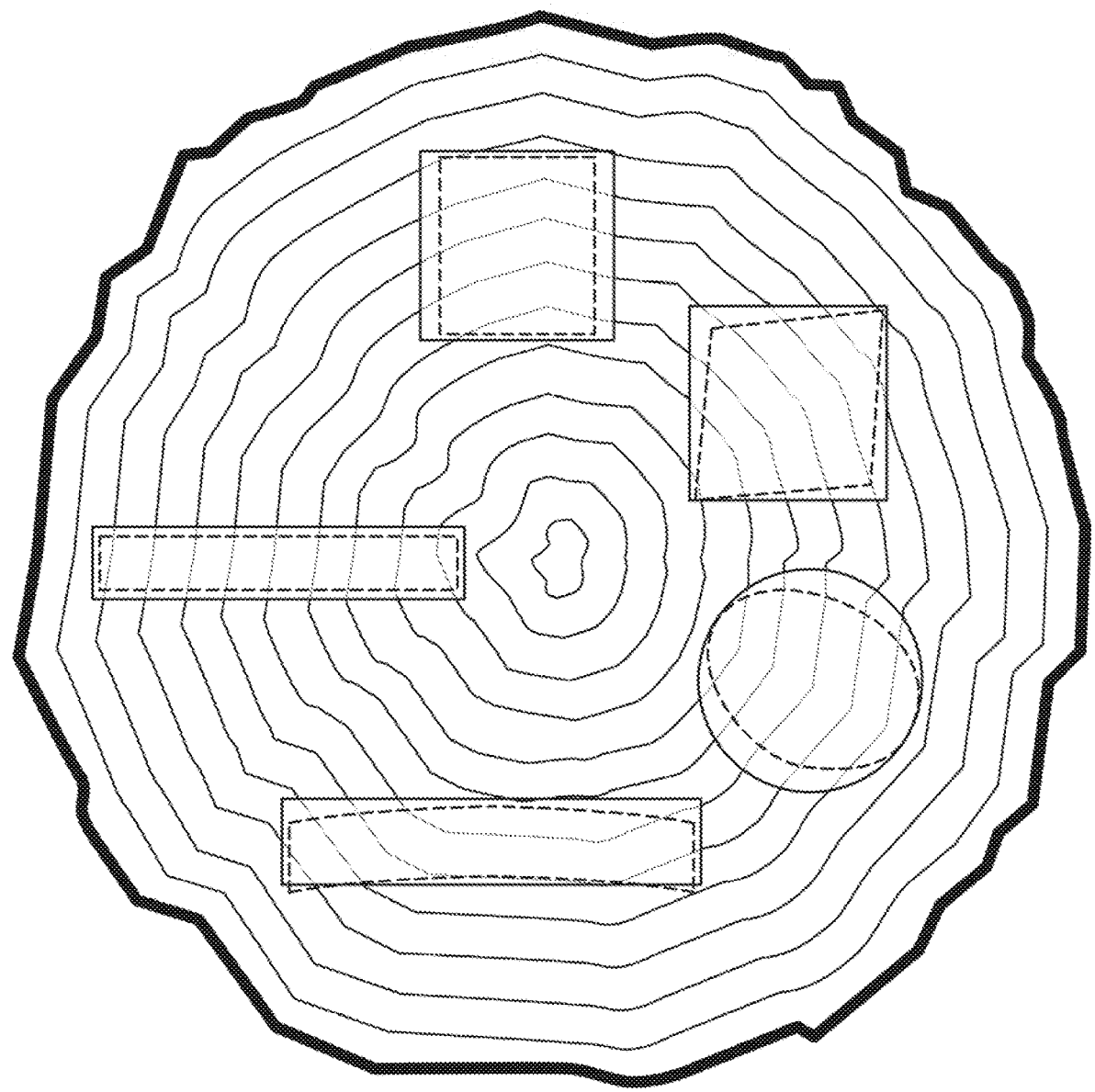
FIG. 1 shows relative amounts and directions of moisture-related expansion and shrinkage experienced by components of various shapes cut from wood or lumber.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE INVENTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

Referring to the Figures, FIGS. 1-13 show embodiments of dowels, preferably harvested from wood in orientations that direct moisture-related dowel expansion and contraction in predetermined directions, and other embodiments such as assemblies or systems that incorporate such directional dowels into dowel-receiving components. For example, a wall system can be assembled using wall panels, surface members, and dowels, incorporating the directional dowels. Assembly systems can include markings on the dowels and dowel-receiving components to align the components so, that when assembled, moisture-related wood movement is directed toward predetermined directions, which can provide for assembly systems of enhanced stability. Finally, such directional dowels and dowel-receiving components can be oriented into configurations that can also provide for assembly systems of enhanced stability or strength.

Embodiment 1: Directional Stepped Dowel

Figure 4A:
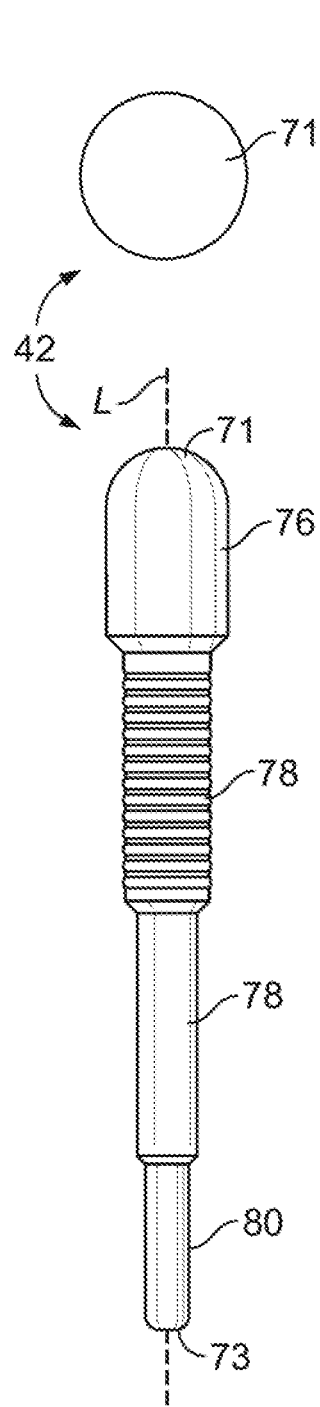
FIGS. 4A-4C shows top and sides views of a wooden dowel showing portions of adjacent growth rings of a tree or branch, the dowel harvested in an orientation such that the growth rings define vertically-oriented layers throughout the dowel.

As shown in FIG. 4, the dowel 42 can comprise a first portion and a second portion. The dowel 42 can have a plurality of dowel sections 74, a first section 76, middle sections 78, and a last section 80. The dowel 42 can have two middle sections; in some other embodiments, it can have no middle section, one middle section, or three or more middle sections. The first and last sections can have sidewalls and end walls, respectively. Each of the middle sections can have sidewalls and step walls, respectively. Each of the dowel sections 74 can be contiguous to another dowel section 74. The sidewalls can define a cross-sectional size for their respective sections.

In a preferred embodiment, the cross-sectional size of the sidewalls can decrease as one progresses from the first section to the last section in a number of steps. In such embodiments, the overall profile of the dowel 42 can generally taper, while individual dowel sections decrease in size in a stepwise fashion, providing a stepped dowel. In some other embodiments, the dowels can have a smoothly tapering profile.

The cross-sectional size of the sidewalls can be any suitable size or shape. The length of each individual dowel section can vary considerably, and the ratios of the lengths of the dowel sections can also vary considerably. For example, the dowel section with the smallest cross-sectional size can be as long as or longer than the length of any of the other dowel sections. The overall length of the dowel 42 can be any suitable length for fastening particular components or particular combinations of components.

The first dowel section 76, which can be the dowel section 74 having the largest circumference or perimeter or cross-sectional size, or have the greatest width, can define a base portion 71. The last dowel section 80, which can have the smallest circumference or perimeter or cross-sectional size, or have the smallest width, can comprise or define a tip portion 73.

A dowel 42 can have dowel sections with a circular configuration, such as shown in FIG. 4. Other embodiments can be constructed so that each dowel section has a substantially square, triangular, or other cross-section. Further embodiments can mix and match different types of sections. The dowel 42 can have other configurations, such as the dowel shown and described in U.S. Pat. No. 6,267,527, which is hereby incorporated by reference.

It is preferred that the dowels be constructed of similar, or even the same, materials as other components of wall systems 10 or other assemblies. For example, in wall systems 10, the wall panels 20, the surface members 46, 48, and dowels 42 can be constructed of similar, or even the same, wooden materials.

Where the dowel is constructed from wood, it is preferred that the dowel be cut, sawed, or otherwise constructed from a single integral piece of wood, such as shown in FIG. 1. Such wooden dowel is preferably made substantially of birch, but can also be made of red oak, cherry, ash, beech, or other suitable tree or shrub, preferably hardwood varieties.

It is preferred that all, or a majority, of the dowel be made from the sapwood of a tree or branch, rather than the heartwood.

Figure 2:
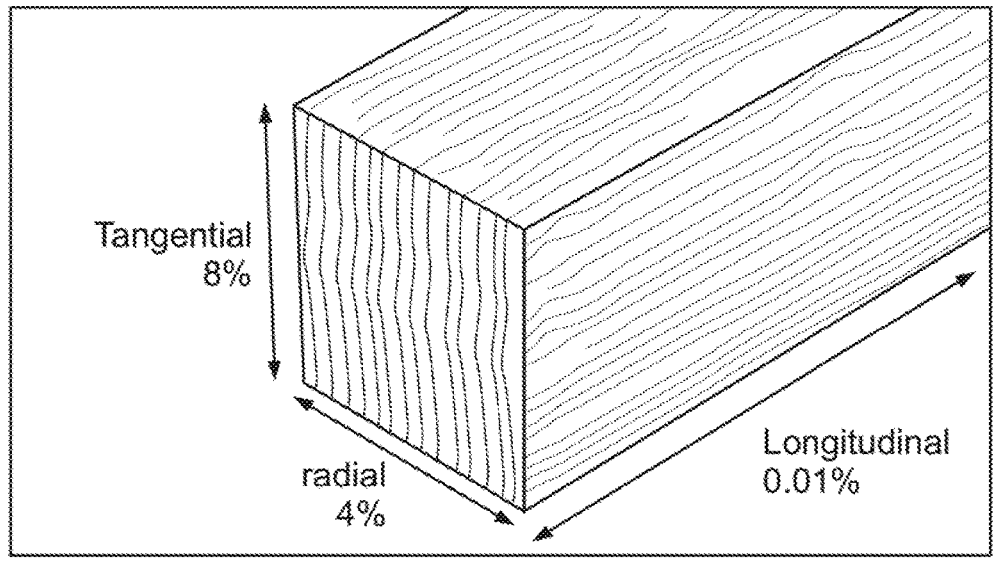
FIG. 2 shows a wooden plank and the amounts of expansion that the wooden plank can experience in its longitudinal, radial, and tangential directions.
Figure 3:
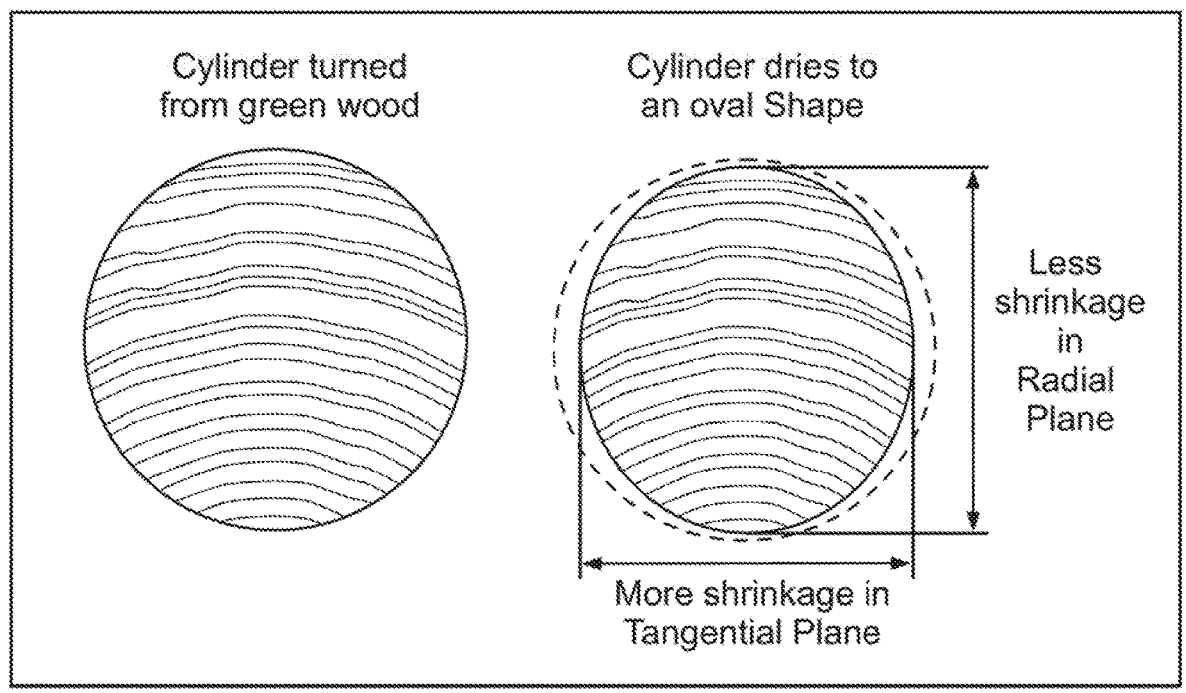
FIG. 3 shows top views of a cylinder harvested from wood, cut from a section of wood that is parallel to the core of a tree trunk or tree branch, encompassing portions of wood from multiple adjacent growth rings, with each growth ring defining a curved pathway through the cylinder. The cylinder can be subject to the greatest degree of shrinkage (and expansion) in the portions of the cylinder containing the end portions of the growth ring layers.

A tree or branch can have a core portion surrounded by a series of growth rings. In a cross section of a tree trunk (or branch), in a plane placed substantially perpendicular to a central longitudinal axis of the tree (or branch), the central core portion of the tree (or branch) can be surrounded by a plurality of generally concentrically arranged growth rings, although those growth rings can contain irregularities in shape, as shown in FIGS. 1-3.

The dowel 42 can be cut from a piece of wood so the dowel encompasses portions of wood from a plurality of adjacent growth rings. Each growth ring can define a layer, so that the dowel includes a plurality of layers defined by a plurality of growth rings, each dowel layer 70 made of an adjacent portion of an adjacent growth ring, as shown for example in FIGS. 3-4. The central longitudinal axis L of the dowel 42 can be located generally parallel with the dowel layers 70 defined by the growth rings. When the dowel is viewed in cross-section, through a plane placed substantially perpendicular to a central longitudinal axis of the dowel, the growth ring layers can define the dowel layers 70 visible as a series of generally parallel lines or curves. Depending on the size of the tree and the size of the tree rings from which the dowel is fashioned, those dowel layers 70 can define substantially straight lines or curved lines. Because trees are living organisms, the growth ring layers can define irregular paths and individual growth rings can have shapes that vary from other growth ring layers in the tree.

As shown in FIG. 4, each dowel layer 70 can be made of a portion of a single growth ring. Neighboring dowel layers 70 can include adjacent portions of wood from adjacent tree rings. Each dowel layer 70 can include an elongated structure defining opposing flat surfaces, each opposing flat surface having a first or base or top end portion, which can be located in the first portion or first section of the dowel, and providing a portion of the upper exterior surface of the dowel. Each opposing flat surface of the dowel layer 70 can have an opposite second or bottom or tip end portion, which can extend to a lower surface of the dowel, and providing a portion of the bottom exterior surface of the dowel. Each dowel layer 70 can include generally opposing first and second side portions that can comprise portions of the exterior sidewall surfaces of the dowel.

Each dowel layer 70 can extend between the upper and lower surfaces of a dowel or between the upper and lower surfaces of a dowel section. It is preferred that the dowel layers 70 be arranged in a substantially vertical orientation throughout the dowel, the layers defining surfaces or strata that run substantially parallel to the central longitudinal axis L of the dowel. The dowel layers 70 can include elongated, sheet like structures with neighboring layers stacked contiguously or continuously against each other.

The opposing flat surfaces of each dowel layer 70 can be substantially flat or curved. Each dowel layer 70 can have a central portion 82 extending between a top end and a bottom end, the central portion 82 including a central longitudinal axis. Each dowel layer 70 can include a side portion 84 on either side of the central portion 82, which can be contiguous with the central portion 82. Some dowel layers 70 can include an end portion 86 on either side of each side portion 84, and each dowel layer end portion 86 can be contiguous with a dowel layer side portion 84.

Where dowel sections decrease in cross-sectional size, the dowel layers 70 in a central portion of the dowel can extend from the top end of the dowel to the base end of the dowel, and dowel layers 70 located distal from the central longitudinal axis L of the dowel can extend through one or more of the uppermost dowels.

The vertical orientation of the plurality of dowel layers 70 can define or indicate the directions in which the dowel 42 expands when exposed to moisture (as well indicating the directions in which the dowel contracts when moisture is removed or lost). When the dowel is viewed in cross-section, or from above, the dowel can be expected to expand to the greatest degree in the dowel layer side portions 84. In each layer, the wood can move from a central longitudinal axis in the dowel layer 70 outward in the direction of the side portions 84 and toward both end portions 86. The primary direction of moisture-related expansion for each dowel layer 70 can originate in a central portion 82 of the dowel layer 70 and result in expansion outward toward each side portion 84 of the dowel layer 70. In some embodiments, the expansion can continue outward from the end portions 86 of each dowel layer 70.

When the dowel experiences a decrease in water content, it can be expected to experience the greatest degree of shrinkage in the opposite direction—with the dowel layers 70 contracting from their side portions 84 inward toward a central longitudinal axis of the dowel layer 70. In some embodiments, the end portions 86 contract inward toward the side portions or toward the central portion 82 of the dowel layer 70.

While wood movement in other directions is possible, the majority of the moisture-related movement in these dowels can be found in the expanding portions 72 of the dowels.

When the dowel layers move in concert, in response to changes in moisture content, the side portions 84 of the dowel layers 70 can expand or contract in similar outward directions contemporaneously or near-contemporaneously. Together, a first expanding portion 72 can encompass the side portions of the dowel surface containing the first sides of the dowel layers 70, to expand from or contract toward a central longitudinal axis of the dowel or dowel section, while a second expanding portion 72 can encompass the side portions of the dowel surface containing the opposed second sides of the dowel layers 70 can expand from or contract toward a central longitudinal axis of the dowel or dowel section. However, the expanding portion 72 comprising the first sides of the dowel can expand and contract in a substantially opposite direction as the expanding portion 72 comprising the second sides of the dowel layers 70. Thus, the outer surface of the dowel can be provided with two sides or two side portions, on approximately opposite sides of the dowel, which can achieve a greater amount of moisture-induced movement than rest of the outer surface of the dowel.

Figure 4B:
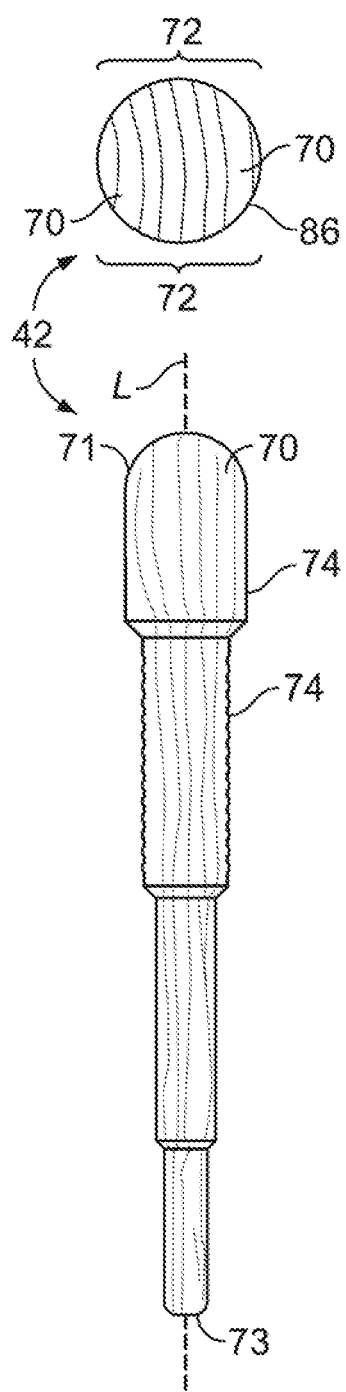
Figure 4C:
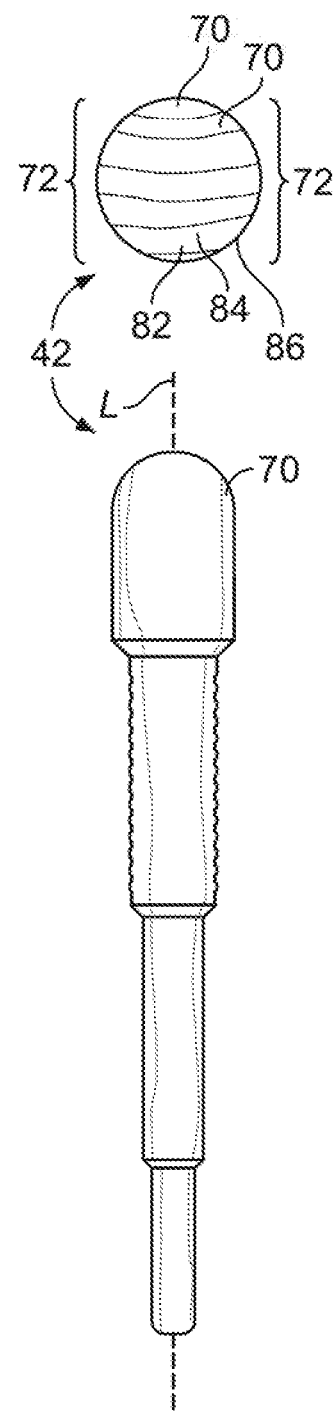
Figure 5:
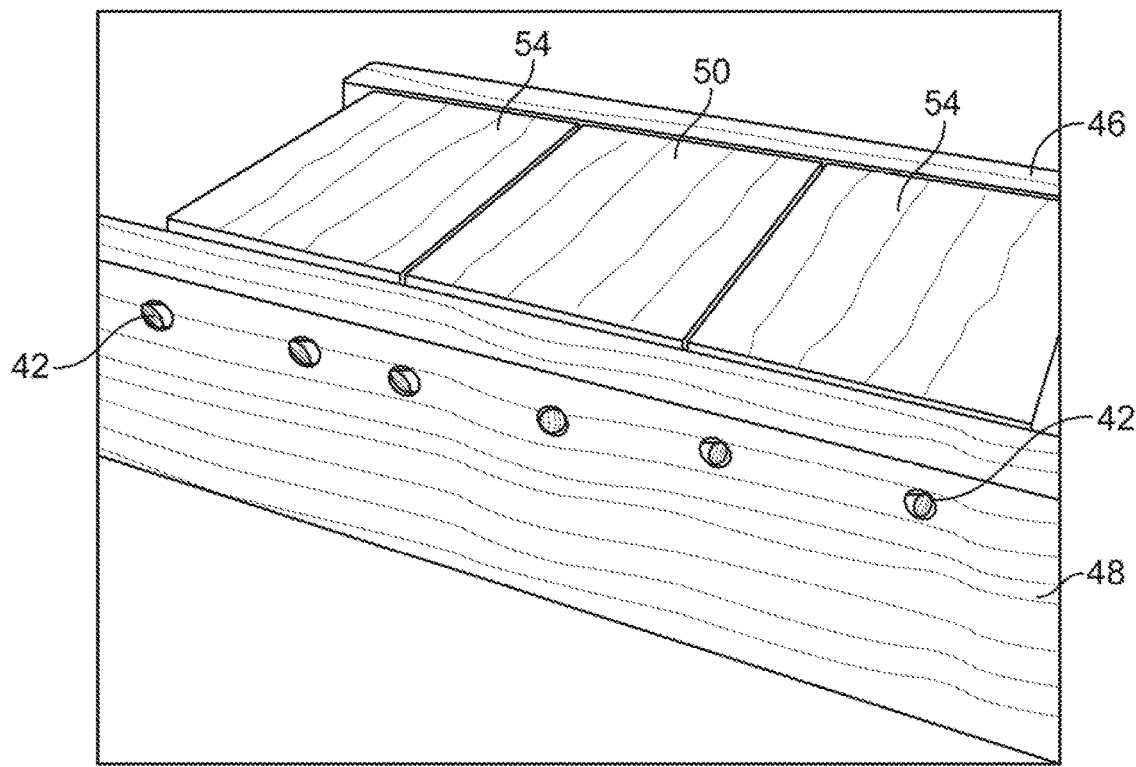
FIGS. 5-10 show perspective views of a wall system incorporating oriented, directional dowels.
Figure 6:
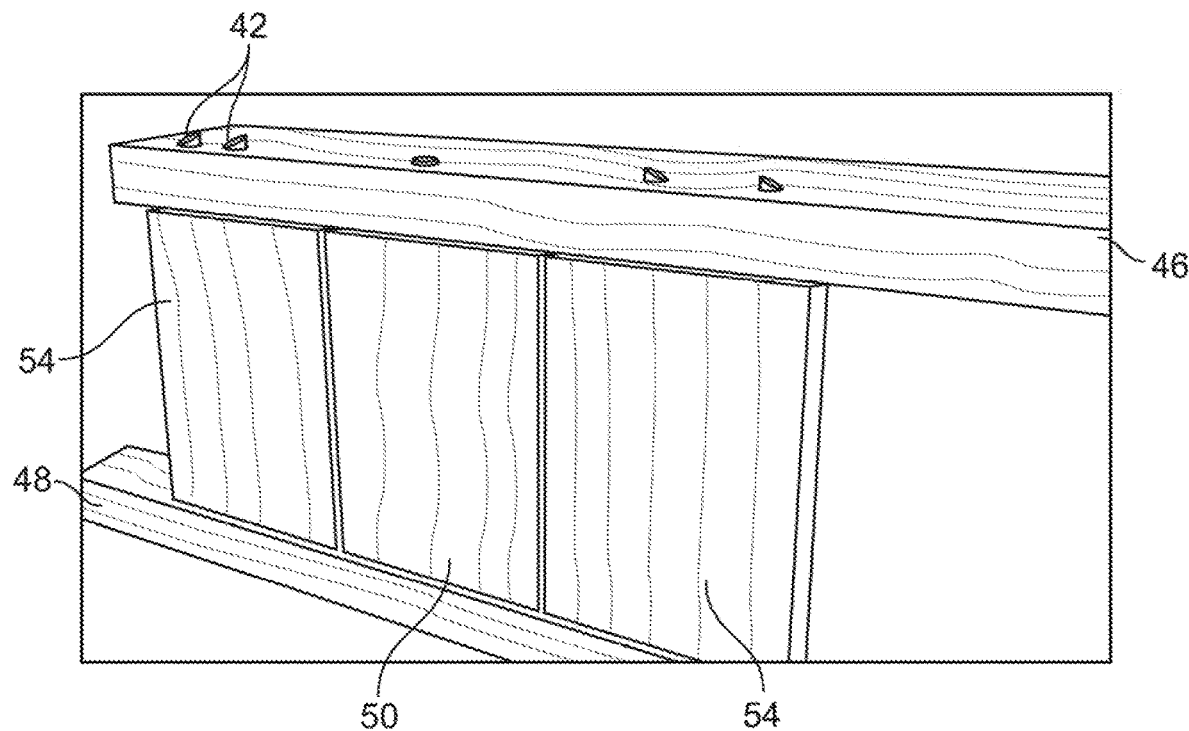
Figure 7:
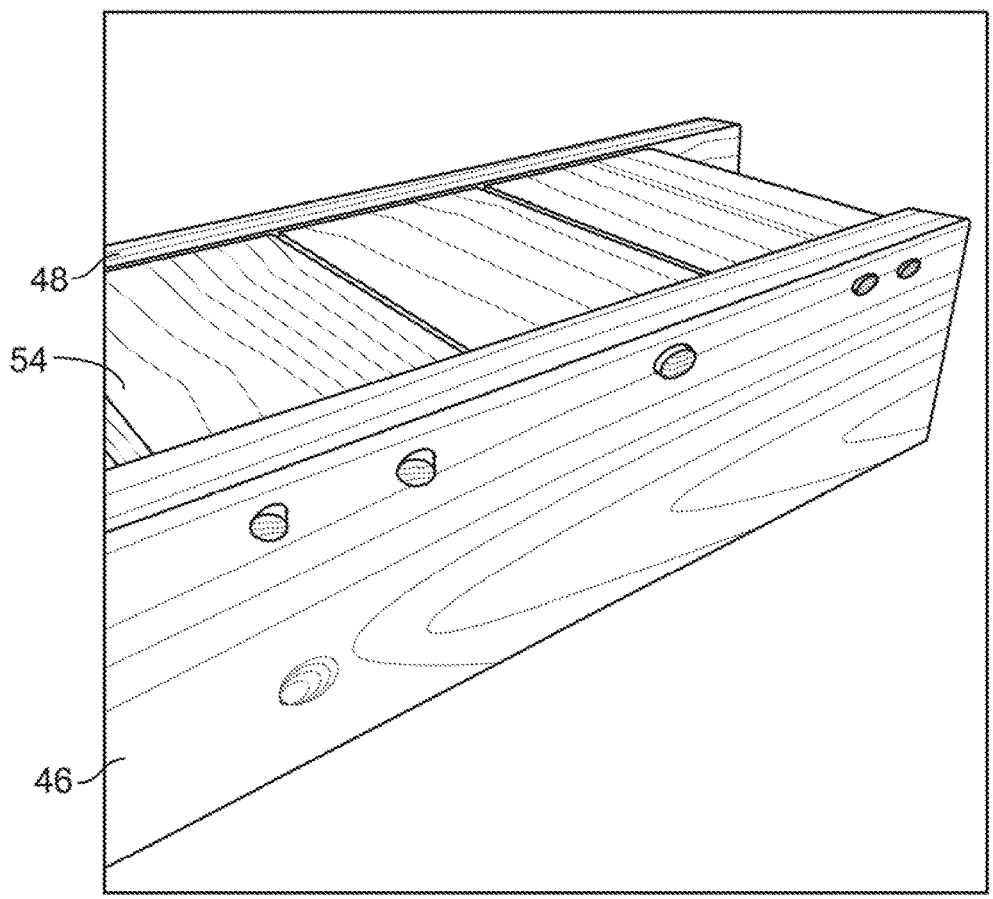
Figure 8:
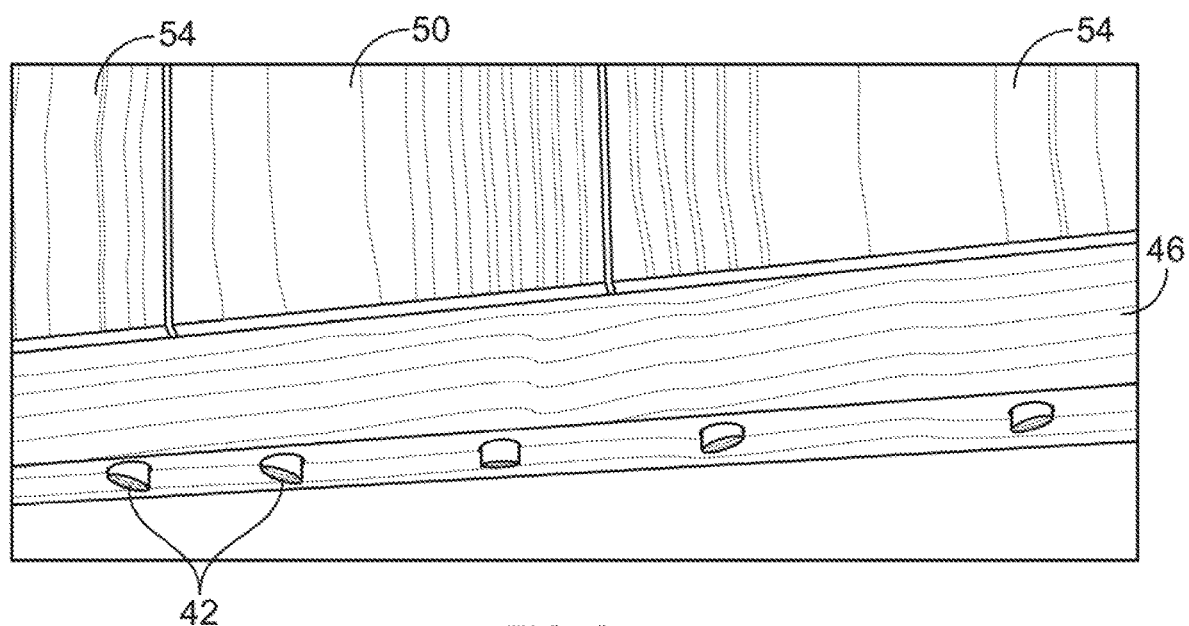
Figure 9:
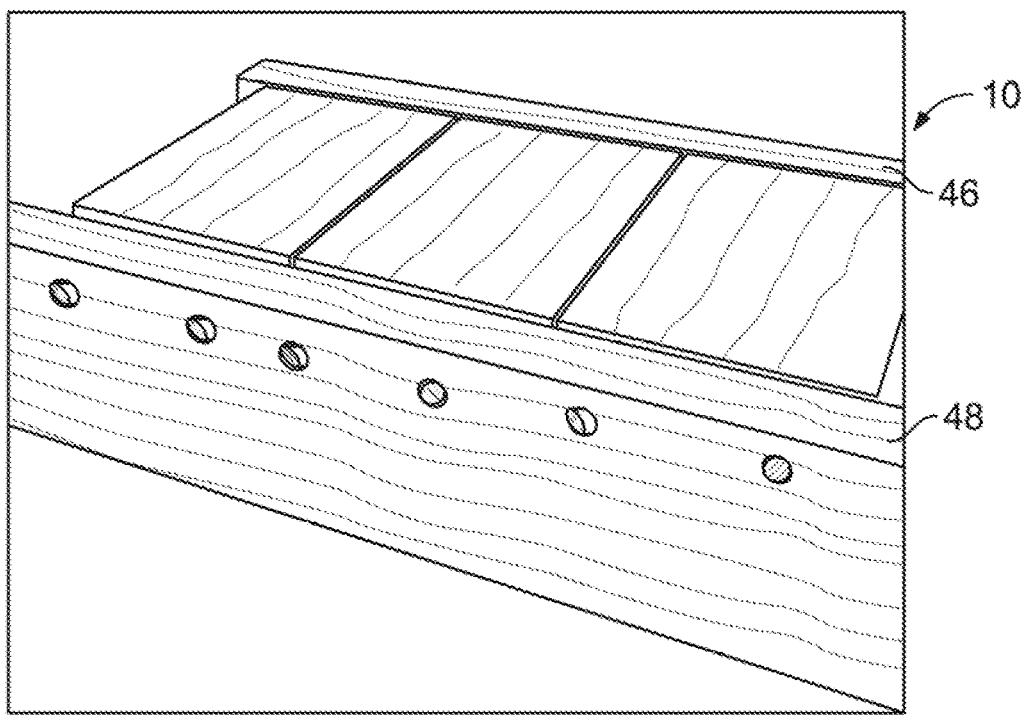

The portions of the dowel containing the side portions 84 of the dowel layers 70 can define the locations of the dowel subject to the greatest degree of expansion or water-related movement. Such expanding portions 72 can be located on the exterior surface of the dowel, on the dowel sidewall. Thus the dowels can be identified as subject to expansion in the directions of the expanding portions 72, and considered as a directional dowel. Such directional dowels can be subject to movement in one or more predetermined directions relative to the longitudinal axis of the dowel, in the directions defined by the expanding portions 72. As shown in FIGS. 4B-4C, the expanding portions 72 can be located on substantially opposite sides of the directional dowel. The expanding portions 72 can also be expected to define the portions of the dowels 42 that are subject to water-related shrinkage or contraction.

Although preferred embodiments incorporate a stepped dowel 42, other wooden dowels 42 having a generally tapering profile can be used, as can other commonly-used fasteners such as nails, screws, shanks, and the like.

Embodiments 2 and 3: Directional Dowel with Mark for Identifying Direction of Dowel Movement, and Marked Dowel-Receiving Component A directional dowel can be inserted into a dowel-receiving item and positioned or aligned in such a way as to direct the moisture-related expansion (and contraction) of the dowel in a particular direction with respect to the dowel-receiving item. Some embodiments of the dowels can be marked, to identify the expanding portions 72 to a user.

Figure 13:
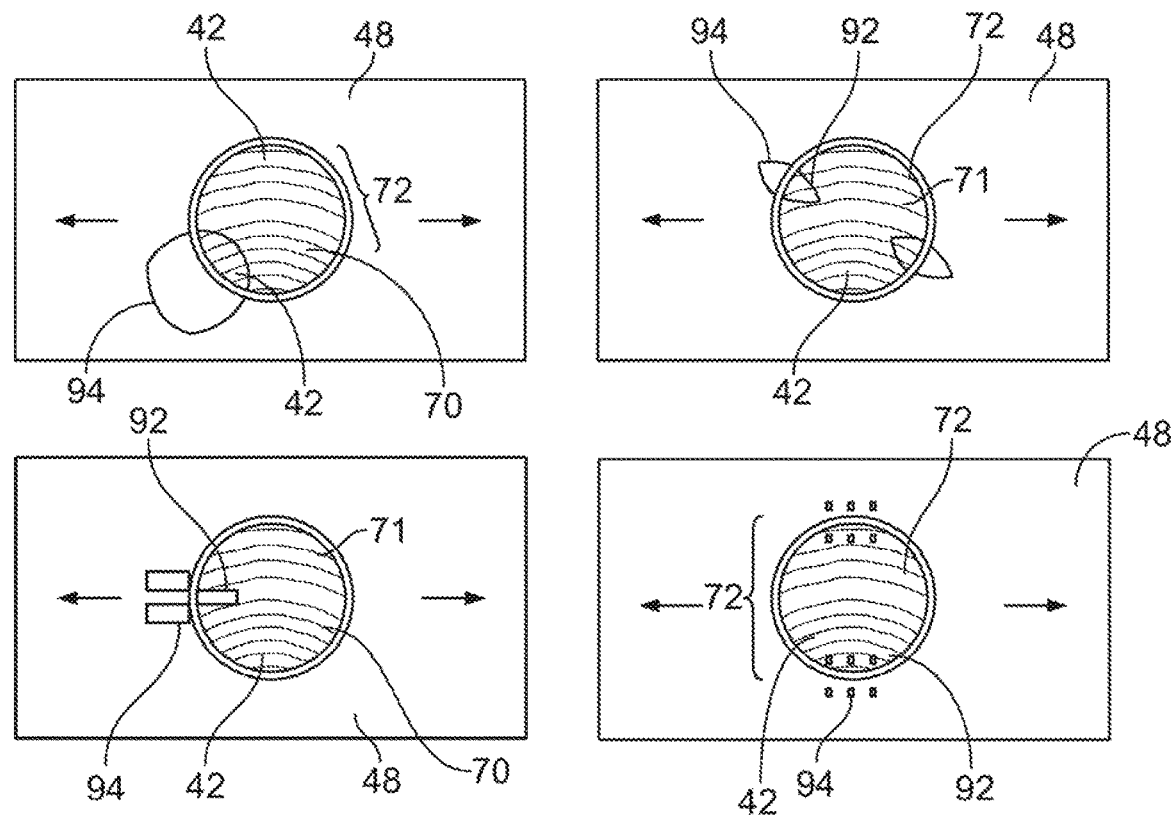
FIG. 13 shows top views of exemplary embodiments of assembly systems incorporating a directional dowel and another component including a dowel-receiving cavity. In these embodiments, the dowel and the dowel cavity include marks that align when the dowel is positioned with its expansion forces aimed in a predetermined direction. In some embodiments, the dowel cavity can include marks that indicate, via sight or touch, the size of the dowel that fits the dowel-receiving cavity.
Figure 13:
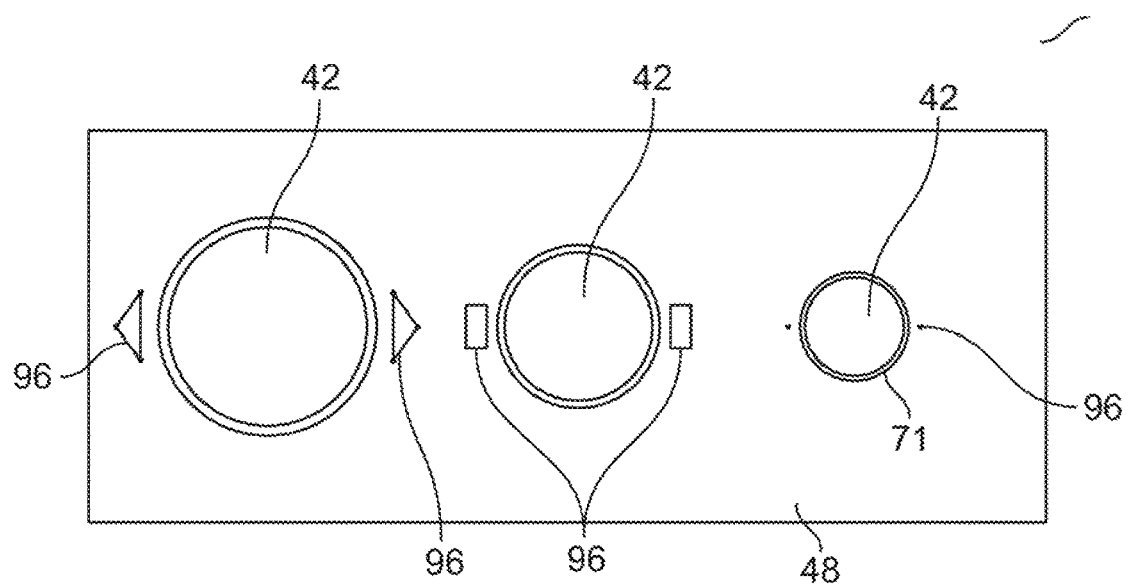

Such dowels can include an orientation member 92 for indicating the orientation of the dowel layers 70, and signaling which side portions of the dowel are subject to significant outward expansion, such as shown in FIG. 13. An orientation member 92 can include one or more marks to identify the locations of the expanding portions 72 of the dowel. Such orientation members 92 can be used in conjunction with an alignment member 94 located on a dowel-receiving component.

For example, a board or a surface member can include an opening for through which a dowel can be inserted, the dowel and opening of sizes that allow the dowel to fit snugly or closely within the opening. The base portion 71 of the dowel can include an orientation member 92 in the form of a bar, an arrow, a spindle, an oval, or a series of dots, for example, to indicate the locations of one or both expanding portions 72 on the dowel. Such marks can be drawn, painted, or otherwise applied to the upper surface of the base portion 71, for example. Such marks can be carved, etched, laser-cut, or filed into the base portion 71, or applied by any other commonly-used method. Other examples include cutting notches or grooves in the base portion 71 (or the portion of the sidewall abutting the base portion 71) to show an individual the locations of the expanding portions 72 of the dowel.

Similar marks can be made to define a corresponding alignment member 94 in the corresponding dowel-receiving component, preferably at the mouth or opening of the dowel cavity, and preferably on an outward-facing surface or structure of the dowel-receiving component.

When a dowel is inserted into a dowel-receiving component having a dowel-receiving cavity, an individual can align the orientation member 92 of the dowel with the alignment member 94 on the corresponding dowel-receiving component. When the alignment and orientation members 94, 92 are aligned together, the dowel can be positioned within the dowel-receiving component so that the directional expansion forces of the dowel are directed in a desired or predetermined direction, relative to the dowel-receiving component.

The dowel-receiving component can include an alignment member 94 having a mark in a variety of forms. The dowel-receiving component can contain a dowel cavity that includes a mouth around its opening. Such mouth can include the alignment member 94 as a marking that communicates with the orientation member 92. For example, the orientation and alignment members 92, 94 can each include a marking in the shape of a bar, the bars forming a straight line when the dowel is positioned in its preferred position. As another example, the orientation member 92 can include a single dot that is positioned between a pair of dots on the alignment member 94. As another example, the orientation member 92 can include a colored segment of a sphere at an edge of the dowel base portion 71, while the alignment member 94 can include a sphere missing a segment of the same size at an edge of the dowel receiving portion mouth, so that when the dowel and the dowel receiving component are placed in the preferred position with respect to each other, the orientation and alignment members 92, 94 form a complete sphere.

In general, the alignment member 94 and the orientation member 92 can each include a mark having a design or pattern that creates a composite visual image or tactile impression that occurs only when the dowel and the dowel-receiving component are positioned to aim the expanding portions 72 of the dowel toward the portions of the dowel receiving portion where it is desired to direct such expansive force. The expansive force can be directed relative to the dowel-receiving component or relative to another component in a wall or assembly system.

This feature can enable an individual to align the components (and to direct the moisture-related expansion forces of the dowel) by mere visual or tactile inspection, for example, without the need for special tools.

Embodiment 4: Dowel-Receiving Component Marked to Indicate Mating Dowel

In some cases, the size of dowel cavity might not be readily discernable to casual inspection. It can be difficult or impossible to see which size dowel fits into a particular dowel cavity. It can be beneficial for the assembly system to be marked in such a way that a user can readily discern which dowels fit into a given dowel-receiving cavity 44, especially in assembly systems using dowels of more than one size or type.

As shown in FIG. 13, for example, some embodiments of the dowel-receiving component can include markings 96 that indicate the size or type of dowel 42 that fits into the dowel cavity. In some embodiments, the mouth or opening defining the dowel cavity can be surrounded by a solid or broken ring, the marking ring having a specific color or pattern that indicates to a user that a specific type or size of dowel fits into the dowel cavity.

In some embodiments, the dowel cavity can include markings 96 that indicate the length of the dowel cavity. In some embodiments, the dowel cavities can include markings 96 that indicate the size of the diameter of dowels that fits into the dowel-receiving cavities. In some embodiments, the markings 96 can identify specific dowels that fit into the dowel-receiving cavities.

Embodiment 5: Assembly System with Oriented Directional Dowel and Oriented Dowel Receiving Component Dowels are typically used in conjunction with a panel, board or other item configured to receive the dowel. The dowel can be used to connect two or more items or components to each other, with the configured items defining a cavity for receiving the dowel. The dowel-receiving member or component can define a dowel-receiving space 44, or dowel cavity, into which the dowel can be inserted for connecting or joining components of an assembly system 200.

Figure 11:
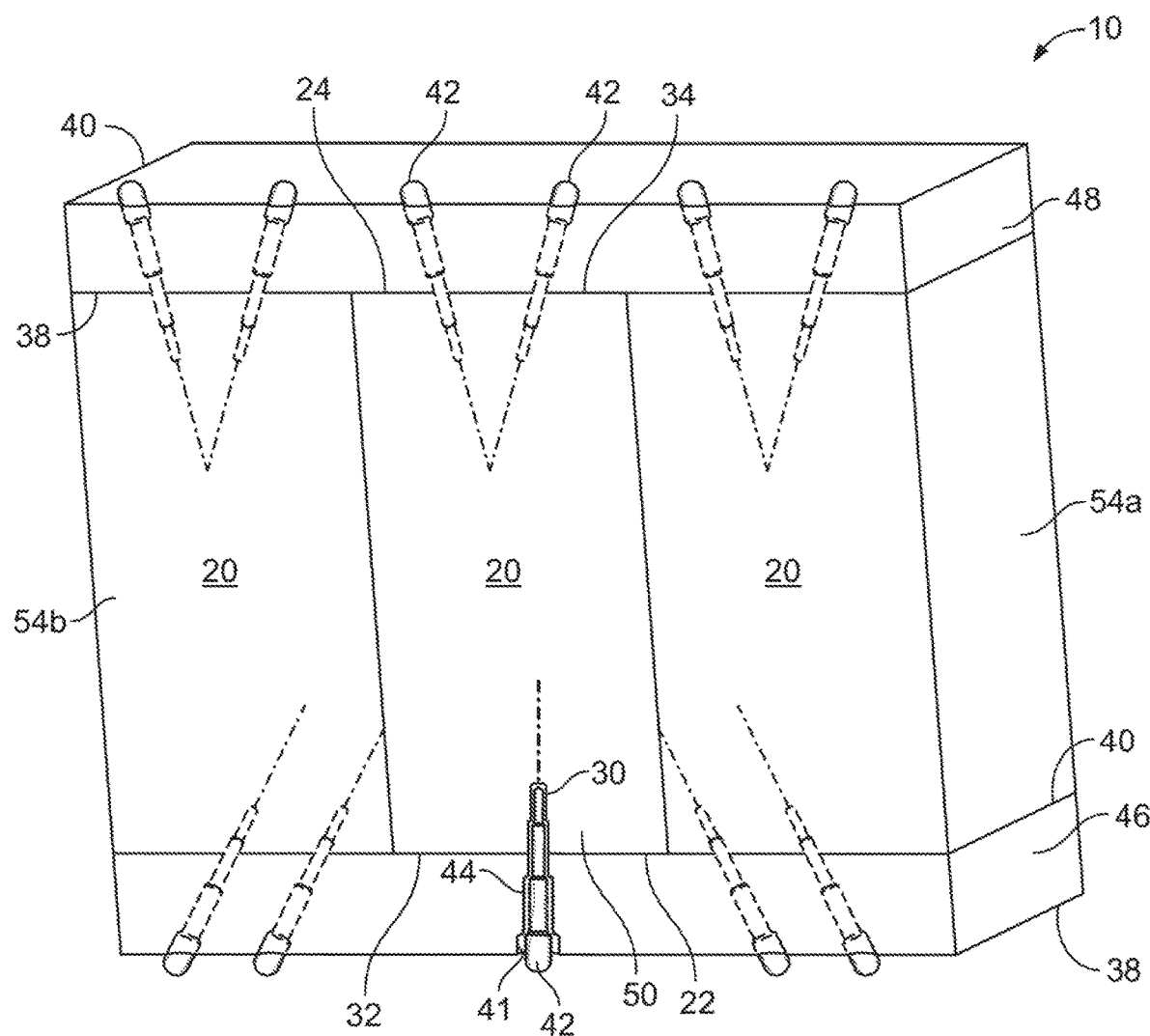
FIG. 11 shows a planned view of an embodiment of a wall system or wall assembly including a central wall panel flanked by first and second flanking wall panels, the top ends of the panels held together by a top surface member and the bottom ends of the panels held together by a bottom surface member. The bottom end of the central wall panel has a dowel-receiving cavity for receiving a dowel oriented substantially perpendicular to the bottom surface member. The dowel cavities in the bottom ends of the flanking wall panels are oriented at a transverse angle with respect to the bottom surface member; the dowel cavities extend toward the central wall panel. The top end of each wall panel includes a pair of top dowel cavities, angled at transverse angles and extending toward each other. Dowels are inserted into the dowel-receiving cavities to assemble the wall panels and the surface members together into the wall system.
Figure 12:
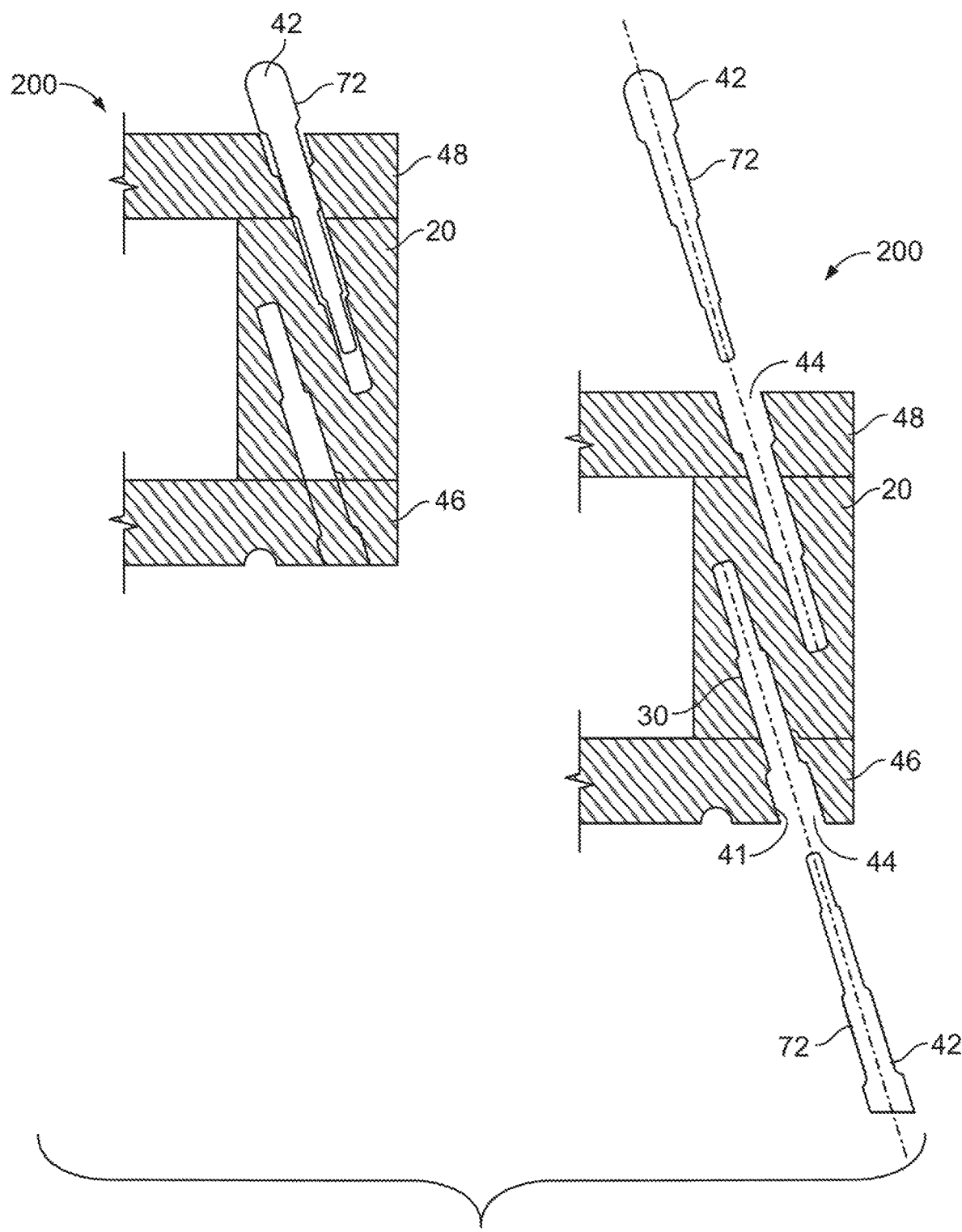
FIG. 12 shows a side cross-sectional view of an assembly system incorporating a directional wooden dowel and another component including a dowel-receiving cavity. The directional dowels can include an expanding portion (heavily shaded) that can be inserted into the assembly system to aim the expansion forces of the dowel in a predetermined direction or orientation; here, so that the dowel's expanding portions move outward toward the outer ends of the components.

The assembly system 200 can be made of a dowel-receiving component and a dowel 42, such as shown in FIGS. 11-12. For example, it can be preferred for the dowel 42 to be positioned so that the expanding portions 72 expand toward the most stable portions of the dowel receiving component (or away from its weakest or least stable portions). Where a plurality of dowels are arranged in a row, it can be preferred that the dowels 42 be positioned so that the expanding portions 72 all expand in the same directions; in other situations, it can be preferred to position the dowels to expand outward in different directions, to avoid placing excessive stress upon a single part in the dowel receiving component or the assembly system 200.

For assembly systems using directional dowels 42 having orientation members 92 to mark the direction in which the dowels move when moisture content changes, the dowel-receiving components can include corresponding alignment members 94 that include marks for guiding a user to position the dowel 42 within the dowel cavity so that the dowel 42 expands in a preferred direction relative to the dowel receiving component.

The alignment member 94 and the orientation member 92 can be aligned, or otherwise arranged to communicate, with each other. Thus, these members can be positioned into coordinated alignment before the dowel 42 and dowel-receiving component are joined or fixed together.

As can be seen in FIG. 12, for example, a pair of dowels 42 can be inserted into an assembly system 200. An upper dowel can be placed into an upper dowel-receiving cavity 44 and a lower dowel can be placed into a lower dowel-receiving cavity 44 so that the expanding portions 72 of each dowel are positioned to expand in a direction away from the other dowel.

The dowel receiving component or member can include an alignment member 94 for communicating with the orientation member 92 of the dowel 42. The alignment members 94 can include a mark or marking for indicating the preferred position or orientation of the dowel within the dowel cavity. Those marks can identify the locations at which it is preferred to position the dowel within respect to the dowel receiving component, and communicate to the individual the preferred location on the dowel receiving component for communication with the expanding portions 72 of the dowel.

Figure 10:
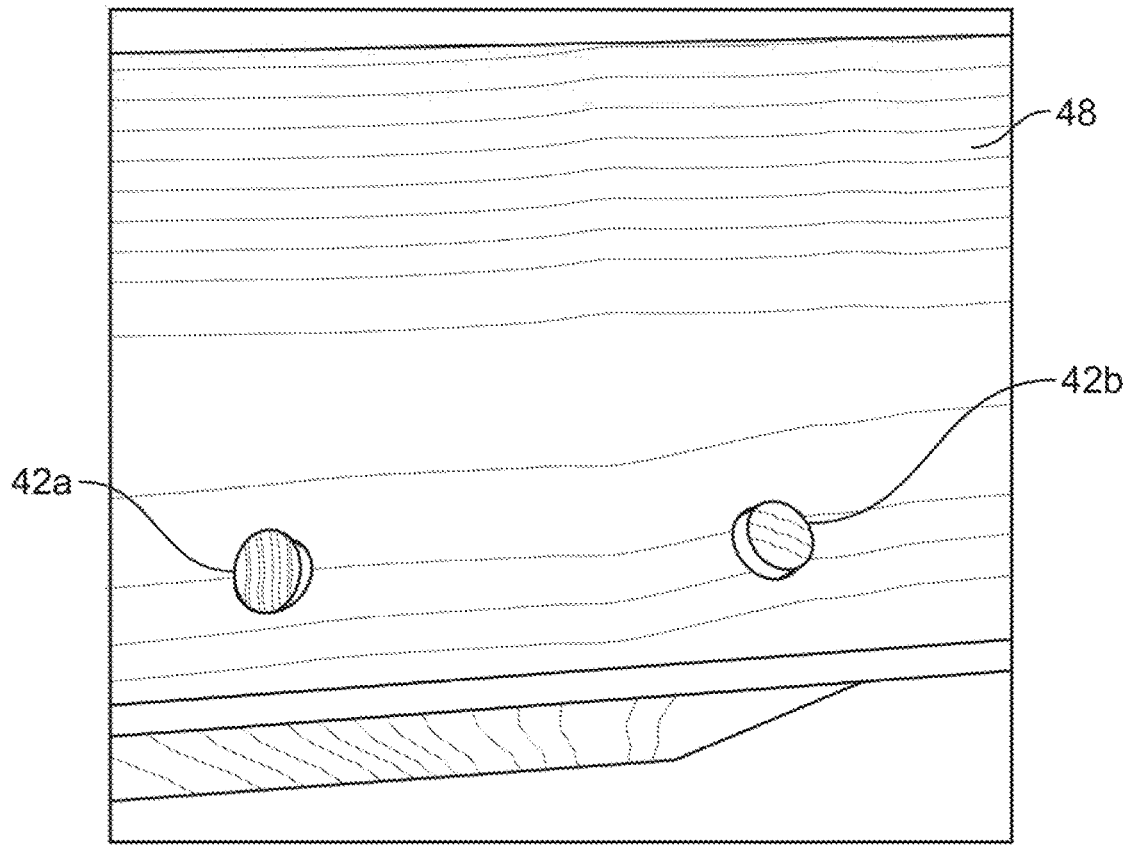

In other embodiments, such as shown in FIG. 10, the dowels 42 can be oriented in a wall assembly so that their expanding portions 72 are oriented to expand toward the side portions of the wall assembly, such as dowel 42a as opposed to dowel 42b. Thus, the dowels can direct expansion and contraction forces away from the portion of the wall system 10 that faces the interior of a room, and can minimize the risk of the interior-facing wall buckling when changes in moisture content cause the wooden dowels to expand or contract.

Wall Systems

As shown in FIGS. 5-11, a wall system 10 can comprise one or more wall panels 20 in arranged in a line or a row, with one end of the wall panels 20 aligned together by a first surface member 46, and with the opposite end of the wall panels aligned together by a second surface member 48, with the wall panels 20 and surface members 46, 48 held together by a plurality of dowels 42. As shown in the figures, in an assembled wall system 10, the first surface member 46 can define an upper side or end of the wall, while the second surface member 48 can define an lower side or end of the wall.

Each wall panel 20 can have a first end portion 22 and an opposing second end portion 24, each providing opposing surfaces for attachment to a surface member. The wall panel 20 can have an elongated, longitudinal, or substantially planar first attachment surface 32 and opposing elongated, substantially planar second attachment surface 34. Each wall panel 20 can comprise a board; for example, a wooden board or plank of any standard size used in construction. Other sizes or materials can be used, depending on an individual's requirements.

Each wall panel 20 can have a plurality of predrilled bores or openings 30 defined therein. Each bore 30 can comprise a depression on an outer surface of the wall panel 20 and extending inward into an interior portion of the wall panel 20, defining an indentation or hollow space within the wall panel. The bores 30 can be positioned in the first and second end portions 22, 24, on the opposing first and second attachment surfaces 32, 34 of the first and second end portions 22, 24.

It is preferred that each predrilled bore 30 traverses the wall panels 20 at a non-perpendicular angle, or acute or transverse angle, with respect to the first and second end portions 22, 24 of the wall panels 20. Each bore 30 can be positioned on an outer surface 32, 34 of the wall panel 20, including an opening that extends inward into the wall panel 20 and defines an elongated cavity inside the wall panel 20.

Each surface member 46, 48 can have include elongated first and second surfaces 38, 40. Each surface member 46, 48 can include a plurality of predrilled holes or channels 41 defining a passageway extending between the first and second surfaces 38, 40 of the surface member 46, 48. It is preferred that the channels 41 be arranged at non-perpendicular angles, acute, or transverse angles, with respect to the first and second surfaces 38, 40, although in some instances, the channels 41 can be placed at a substantially right angle with respect to the first and second surfaces 38, 40.

When a surface member 46, 48 is placed against a wall panel 20, it is preferred that each channel 41 align with a corresponding bore 30 so that the two structures aligned to together define a space or cavity suitably shaped 44 for receiving a dowel 42. In preferred embodiments, the defined space or cavity 44 forms a space suitable for a stepped dowel 42, as described above.

A plurality of wall panels 20 can be arranged parallel to each other, and can be placed side-by-side as shown in FIGS. 5-11. The first end portion 22 of the wall panel 20 can be placed in communication with a first or bottom surface member 46, while the second end portion 24 of the wall panel 20 can be placed in communication with a second or top surface member 48. Each wall panel 20 is preferably positioned so that each bore 30 can communicate with a corresponding channel 41. When the wall panels 20 are aligned with i) the bottom surface member 46 communicating with the first end portion 22 of the wall panels 20, and ii) the top surface member 48 communicating with the second end portion 24 of the wall panels 20, the corresponding bores 30 and channels 41 can form dowel cavities 44 into which dowels 42 and/or adhesives can be inserted. Thus, the components of the wall system 10 can be fixed together to form the wall system 10.

Embodiment 6: Improved Wall Systems with Directional Dowels

Embodiments of the wall system 10 can include wall panels 20 having special configurations and dowel cavities 44 (for example, comprising communicating channels 41 in surface members 46, 48 and bores 30 in wall panels 20) having particular placements and orientations, such as shown in FIG. 11. Some embodiments can include directional dowels 42 as components.

A plurality of wall panels 20 can be configured to be adjacent and parallel to each other in the wall system 10. Between its first and second end portions 22, 24, the wall panel 20 can have a first planar surface for facing outward in the assembled wall system 10, with an opposed second planar surface for facing inward in the assembled wall system 10. Each of the planar surfaces can have opposing first and second sides.

The wall panels 20 can include a central wall panel 50, for placement in a central portion of the completed wall system 10. The wall panels 20 can include one or more flanking wall panels 54, at least one flanking wall panel located to each side of the central wall panel 50. Some configured wall systems 10 can include a central wall panel 50 with a single flanking wall panel 54 to either side of the central wall panel 50. Other wall systems can include multiple flanking wall panels 54 to one or both sides of the central wall panel 50.

It is preferred that the central and flanking wall panels 50, 54 form a continuous or contiguous wall surface in the completed wall assembly or wall system 10.

Each end portion 22, 24 can include at least one bore 30 located in the each end portion, but preferably includes more than bore 30. The bore 30 can define a transverse angle with respect to the surface of the end portion, or with respect to the attachment surface. It is preferred that the bore 30 define a passageway that extends away from a longitudinal axis of the central wall panel 50. Where there are multiple bores 30, it is preferred that they define passageways parallel to each other. Together, the corresponding bores 30 and channels 41 can define dowel-receiving cavities 44 in the top end of the assembled wall system 10, such as shown in FIG. 11.

The first or bottom end portion 22 of the central wall panel 50 can be placed in communication with a first or bottom surface member 46, while the second end portion 24 of the wall panel 20 can be placed in communication with a second or top surface member 48.

The first end portion 22 can include at least one bore 30 located in a central portion of the first end portion 22. It is preferred that the at least one central bore 30 define a substantially right angle with respect to the surface of the first end portion 22, particularly with respect to the first attachment surface 32. The bottom surface member 46 can include a channel 41 having a corresponding and substantially right angle with respect to the bottom surface member 46.

When wall panels 20 and surface members 46, 48 are aligned together, corresponding bores 30 and channels 41 can communicate with each other to define dowel-receiving cavities 44, such as shown in the assembled wall system 10, such as shown in FIG. 11. For example, the central dowel-receiving cavity 44 in the bottom end of the central wall panel 50 can be parallel to a central longitudinal axis of the central wall panel 50. The dowel-receiving cavities 44 in the bottom end of the flanking wall panels can angle inward and upward toward the central wall panel 50 or toward a central longitudinal axis of the wall system 10.

The central bore 30 and corresponding channel 41 can align to form a dowel-receiving space or cavity 44 and that dowel-receiving cavity 44 can be oriented at a substantially right angle with respect to a longitudinal central axis of the central wall panel 50. As shown in FIG. 11, the central wall panel 50 can include a bore 30 placed substantially perpendicular to the first end portion 22, while the bottom surface member 46 can include a corresponding channel 41 placed substantially perpendicular to the bottom surface member 46. The channel 41 can be placed in a central portion or at the center point of the bottom surface member 46.

The wall panels 20 and surface members 46, 48 can also include corresponding bores 30 and channels 41 that communicate with each other to define dowel-receiving cavities 44 oriented at transverse, non-right angles with respect to the bottom surface member 46.

The bottom end of the central wall panel 50 can form part of a central dowel-receiving cavity 44 for receiving a dowel oriented substantially perpendicular to the bottom surface member 46. Other dowel-receiving cavities 44 (made, for example by other dowels and channels aligned to communicate with each other) in the bottom ends of the central and flanking wall panels 50, 54 can be oriented at transverse angles with respect to the bottom surface member 46; those dowel-receiving cavities 44 can angle upward and inward, extending toward the central wall panel 50. The dowels placed in those dowel-receiving cavities can also define transverse angles with respect to the wall panels or bottom surface member 46.

The second or top end portion 24 of each wall panel 20, which can be placed in communication with a second or top surface member 48, can include one or more bores 30, each bore 30 distal from a longitudinal axis of the wall panel 20. Pairs of bores 30 can be placed at transverse angles to the top end portion 24. In the top end of each wall panel, a pair of bores 30 can be configured to extend from the top end portion 24 toward the bottom end of the wall panel 20. Of each paired set of bores, the first and second bores can extend inward toward each other or can extend inward toward a central longitudinal axis of the wall panel 20.

When wall panels 20 and surface members 46, 48 are aligned together, corresponding bores 30 and channels 41 in the top ends of the wall panels 20 can communicate with each other to define dowel-receiving cavities 44 in the top ends of the wall panels 20, such as shown in the assembled wall system 10, such as shown in FIG. 11. The bores 30, channels 41, and dowel-receiving cavities 44 in the top end of the wall panels 20 can angle downward, toward the bottom ends of the wall panels 20 or toward a central longitudinal of the wall panel 20.

Each surface member 46 can include a channel 41 having a corresponding transverse orientation with respect to an adjacent surface member 46. In particularly preferred embodiments, the flanking wall panel 54 can include a pair of bores 30 placed transverse to the first end portion 22, while the bottom surface member 46 can include a corresponding pair of transversely-placed channels 41 in the bottom surface member 46. Where multiple bores 30 define passageways parallel to each other, so too can the corresponding channels 41 define cavities that are parallel to each other, and corresponding bores and channels can communicate to define dowel-receiving cavities that are parallel to each other.

In some embodiments, such as shown in FIG. 11, the central wall panel 50 can be flanked by one or more first flanking wall panels 54a on one side and one or more second flanking wall panels 54b on the opposite side. On its bottom end, the central wall panel 50 can include a central bore 30 extending upward, oriented parallel to a longitudinal axis of the central wall panel 50. On its top end, the central wall panel 50 can include a pair of bores extending downward that define passageways extending toward each other within the central wall panel 50.

On its bottom end, each flanking wall panel 54 can include one or more bores 30 angled upward, each bore oriented at an angle toward one of the side walls of the flanking wall panel 54. Where there is a plurality of bores 30, it is preferred that they define passageways that are located parallel to each other.

On its top end, each flanking wall panel 54 can include one or more bores 30 angled downward, each bore oriented at an angle toward one of the side walls of the flanking wall panel 54. Where there is a pair of bores 30, it is preferred that they define passageways that extend toward each.

When the bottom end portions 22 of the wall panels 20 are placed in communication with a bottom surface member 46, and the top end portions 24 of the wall panels 20 are placed in communication with a top surface member 48, communicating bores 30 and channels 41 can define dowel-receiving cavities 44 for receiving dowels, especially the directional dowels described herein. Adhesive can be added to the cavities 44 or dowels to fix the aligned components of the wall system 10 components into a predetermined or preferred position.

In such embodiments, the bottom bores 30 located in the bottom end portions 22 can extend away from the central wall panel 50 in a first direction. The bottom bores 30 located in the top end portions 24 can extend away from the central wall panel 50 in a second direction. That is, the bottom bores 30 on one side of the wall system 10 can extend away from the bottom bores on the other side of the wall system 10. So, too, can the corresponding channels 41 in the bottom surface member 46 be set at transverse angles angling away from the central wall panel 50 or away from a central longitudinal axis of the wall system 10.

When the wall members and surface members are configured in proper alignment with each other, dowels 42 can be placed in the dowel cavities 44 to fasten the components of the wall system 10 together.

The dowels of the assembled wall system 10 such as shown in FIG. 11 can be fixed in preferred configurations. The wall system 10 can have a central bottom dowel that is oriented parallel to a central longitudinal axis of the wall system 10. Other bottom dowels can be aligned to extend from a surface of the wall system 10 toward the central longitudinal axis of the wall system 10. The flanking bottom dowels on one side of the wall systems 10 can angle inward at a common first angle, while the flanking bottom dowels on other side of the wall systems 10 can angle inward at a second angle. Each wall panel can include a pair of upper dowels, where one dowel extends into the wall panel toward the other dowel.

In particularly preferred embodiments, the wall system 10 includes wooden components and adhesive. The use of wooden dowels 42 and wooden surface members 46, 48, which, along with adhesive, can be constructed into a wall system 10 that exceeds industry requirements for strength and stiffness. Such wall systems 10 can resist rough handling during construction, and can resist moisture-related weakening after construction and installation.

Embodiment 7: Assembling an Improved Wall Systems with Directional Dowels

An assembly system 200 such as described in Embodiment 7, and such as shown in FIG. 11, can be made using one or more wall panels 20, a bottom surface member 46, and a top surface member 48, with the components held together by a plurality of directional dowels 42.

The bottom surface member 46 can have an inward-facing surface opposite an outward-facing surface, where the inward-facing surface communicates with the bottom ends of the wall panels 20. The top surface member 48 can have an inward-facing surface opposite an outward-facing surface, where the inward-facing surface communicates with the top ends of the wall panels 20. When the wall panels 20 are aligned between the surface members 46, 48 into a predetermined configuration, the directional dowels can be used to join the components together.

The improved wall system 10 can include a central wall panel 50 located in a central portion of the assembled wall system 10, plus at least one flanking wall panel 54a positioned on one side of the central wall panel 50 and at least one flanking wall panel 54b positioned on the opposite side of the central wall panel 50. In the assembled wall system 10, the central wall panel 50 is between and adjacent to a pair of flanking wall panels 54a, 54b.

To assemble such a wall system 10, directional dowels can be inserted into the plurality of channels of the bottom surface member 46; preferably all of the dowels are inserted into the outward-facing side of the bottom surface member 46, with the tip portions 73 of the bottom dowels protruding out of the inward-facing side of the bottom surface member 46.

The orientation member 92 of each dowel can be aligned with an alignment member 94 on the corresponding channel, so that the expanding portion 72 of the dowel 42 is aimed in a preferred direction relative to the finished wall system 10.

One or more flanking wall panels 54 can be slid onto to the protruding tip portions 73 of the bottom dowels, and configured so that the bottom end of the flanking wall panel 54 connects or joins to the top end of the bottom surface member 46. The bottom side of each flanking wall panel 54 can include bores 30 for receiving the tip portions 73 protruding from the bottom surface member 46; the tip portions 73 can engage the corresponding bores 30.

The central wall panel 50 can be attached to the protruding tip portion 73 of a centrally-located bottom dowel. The central wall panel 50 can be oriented so that its bottom end connects or joins or lies flush against the top end of the bottom surface member 46.

After a wall panel 20 is aligned against the bottom surface member 46, the bottom dowels 42 can join the two components together.

The wall panels 20 can be adjusted to define an elongated surface. The wall panels 20 can be configured so that adjacent sides are continuous or contiguous with each other.

The top surface member 48 can be aligned to the partially-assembled wall panels so that the channels 41 of the top surface member 48 communicate with corresponding bores 30 in the top surfaces of the wall panels 20, thus creating top dowel-receiving cavities 44.

Directional dowels 42 can be inserted into the top dowel-receiving cavities 44. Where the top ends of the wall panels 20 are configured to accept a pair of dowels 42, the dowels can be oriented so that the dowels are positioned so as to extend toward each. Preferably, pairs of top dowels 42 are configured to angle from a top corner of the wall panel 20 toward a central longitudinal axis of that wall panel.

The orientation member 92 of each dowel can be aligned with an alignment member 94 on the corresponding channel, so that the expanding portion 72 of the dowel 42 is aimed in a preferred direction relative to the finished wall system 10.

After a wall panel 20 is aligned against the top surface member 48, the top dowels 42 can join the two components together.

Adhesive can be added to the dowels, bores, channels, or dowel-receiving cavities as and when desired during the assembly of the wall system 10.

In a preferred embodiment, the components can be assembled in a particular orientation and particular order that facilitates easier assembly of the system. The bottom surface member 46 is be oriented so that its outward-facing surface faces downward and its inward-facing surface faces upward. The bottom surface member 46 can be placed on a substantially flat surface, such as the ground, floor, pallet, or table top, though any surface can be used so long as it orients the bottom surface member 46 so its outward-facing surface faces downward and its inward-facing surface faces upward. The component can be fixed into the desired orientation by a tool such as a scaffold, or vise, or the like; it can even be held in the desired orientation by hand.

The bottom dowels 42 can be inserted into the bottom surface member 46 before, during, or after being placed in the preferred orientation, so that the tip portions 73 of the dowels 42 extend upward. The orientation member 92 of each dowel 42 can be aligned with an alignment member 94 on the corresponding channel 41, so that the expanding portion 72 of the dowel 42 is aimed in a preferred direction relative to the finished wall system 10.

The wall panels 20 are manipulated to engage the bottom surface member 46. When the bottom surface member 46 is in the preferred configuration, each wall panel 20 can be oriented in an upright position, with its central longitudinal axis oriented to be substantially perpendicular to the bottom surface member 46. In this orientation, each wall panel 20 can be positioned above the bottom surface member 46 and dropped or moved onto the bottom surface while moving in a vertical direction.

At least two flanking wall panels 54 are added to the assembly before the central wall panel 50 is added. The flanking wall panels 54 are dropped from above onto the tip portions 73 of the bottom dowels 42.

The bottom bores of a flanking wall panel 54 can slide onto or engage corresponding bottom dowels 42. Because the bottom dowels are angled toward the central longitudinal axis of the wall system 10, the flanking wall panel 54 cannot be dropped in a directly vertical line or path onto the dowels. Instead, to accommodate the transversely-angled bottom dowels, the flanking wall panel 54 must be dropped or moved in a vertical direction from a central portion of the wall system until the tip portions 73 of the dowels 42 meet the openings of the bottom bores 30. When the tip portions 73 and bores 30 engage, the flanking wall panel's vertical descent alters its angle of descent, moving both downward and away from the longitudinal central axis of the wall system 10.

A first flanking panel 54a can be placed to one side of the wall system 10, and a second flanking panel 54b can be added to the other, opposite side of the wall system 10, leaving a gap in the central portion of the wall system 10. Additional flanking wall panels 54 can be added to either or both sides at this time, so long as a central space is left for accepting the central wall panel 50.

The central wall panel 50 can be dropped or moved from above in a substantially vertical direction, so that its central bottom bore engages the central bottom dowel. The central bottom bore 30 and central bottom dowel 42 are configured to define pathways that are perpendicular to the bottom surface member 46, to allow the central wall panel 50 to descend in a vertical line or path to engage the bottom surface member 46.

The top surface member 48 can be positioned to be dropped onto the top ends of the wall panels 20, or otherwise manipulated against the wall panels 20 in a predetermined configuration. The inward-facing surface of the top surface member 48 can engage the top ends of the wall panels. Adopting the predetermined configuration causes corresponding bores and channels to align and communicate with each other, to define dowel-receiving cavities at the top side of the wall system 10. Additional directional dowels can be inserted into the dowel-receiving cavities, and all of the dowels 42 can be positioned to aim their expanding portions 72 in desired directions.

The top dowels 42 can inserted into the top surface member 48 before, during, or after being placed in the preferred orientation, so that the tip portions 73 of the dowels 42 extend upward. The orientation member 92 of each dowel 42 can be aligned with an alignment member 94 on the corresponding channel 41, so that the expanding portion 72 of the dowel 42 is aimed in a preferred direction relative to the finished wall system 10.

Adhesive can be added to the dowels, bores, channels, or dowel-receiving cavities as and when desired during the assembly of the wall system 10.

In some embodiments, the directional dowels 42 can be preshrunk before their addition to the wall system 10. For example, the directional dowels could be subjected to drying or desiccation, to make the dowels shrink to a smaller-than-normal size. Such preshrinking activity could make it easier to insert and orient the dried dowels 42 into the dowel-receiving cavities 44, which are typically sized to accept a dowel of a similar size or volume. After being seated within the dowel-receiving cavity 44, the dowel 44 would be subject to expansion when it encounters moisture, creating a tighter or snugger connection between the dowel 42 and corresponding cavity 44.

Embodiment 8: CLT Made with Directional Dowels

Certain wood products, such as glue laminated timber (GLT) and cross-laminated timber (CLT) are made of a plurality of wooden sheets or layers stacked together and can be held together with an adhesive compound. Such timbers can be made by securing the wooden layers with directional dowels, either in lieu of or in addition to use of adhesive compounds.

Much as channels 41 or dowel-receiving cavities 44 can be introduced into wall system components, similar channels 41 or dowel-receiving cavities 44 can be drilled, cut, or otherwise introduced into some or all of the layers of wood that make up the GLT or CLT.

Wooden layers including channels can be stacked and configured so that channels 41 in adjacent layers align to define a dowel-receiving cavity 44. In some cases, dowel-receiving cavities 44 can be formed in stacks of wooden layers.

Multiple wooden layers can be fixed together by inserting a directional dowel into a dowel-receiving cavity 44 that spans adjacent wooden layers.

A section or piece of GLT or CLT can be assembled using one or more directional dowels, the dowels configured to direct the expanding forces of the dowels in desired directions. A user could prefer to direct the expansion forces in a variety of directions, to disperse the directional water-related forces of the dowels and minimize warping in an assembled timber. In other embodiments, it may be preferred to orient the directional dowels to expand toward or away from a common point or structure. For example, it could be preferred to direct the water-related expansion of the dowels toward the center of the assembled timber or away from the outer edges of the assembled timber.

In some embodiments, the directional dowels can be positioned so that their expanding portions expand in the direction of the grain of the top layer or panel. When such dowels undergo water-related expansion, the expanding portions are expected to direct expanding portions in a direction parallel to adjacent growth rings. Thus, the expanding forces are less likely to separate neighboring growth ring layers, and less likely to create splits in the wooden layers or panels.

Specific embodiments of a wall system 10 and a directional dowel 42 according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. It is understood to encompass the present invention and any and all modifications, variations, or equivalents that fall within the spirit and scope of the basic underlying principles disclosed and claimed herein.

What is claimed is:

1. A wooden dowel comprising:
   a base portion and a tip portion, the base portion including an orientation member;
   a plurality of dowel sections, each successive dowel section having a diameter smaller than a diameter of a preceding dowel section; and
   a plurality of vertically-oriented layers, each layer comprising a portion of a growth ring; wherein each pair of adjacent growth ring layers comprises adjacent portions of adjacent growth rings; and
   the orientation member including a mark indicating an orientation of the growth ring layers throughout the dowel sections;
   wherein, when the dowel is exposed to moisture, the growth ring layers expand in a horizontally-oriented direction.

2. The wooden dowel of claim 1, comprising portions of a wood from a plurality of growth rings.

3. The wooden dowel of claim 1, wherein a majority of the dowel is made from sapwood.

4. A wall system comprising:
   a plurality of elongated wall panels, having a pair of opposing attachment surfaces, including: a central wall panel positioned between first and second flanking wall panels;
   upper and lower surface members, having upper and lower opposing elongated longitudinal surfaces;
   the central, first and second flanking wall panels being adjacent and parallel to one another; and the surface members being spaced and parallel to one another, and transverse to and adjacent the central, first and second flanking wall panels, with the lower elongated longitudinal surface of each surface member in contact with a one of the attachment surfaces of each of the central, first and second flanking wall panels;
   a plurality of wooden dowels;
   wherein the wall system is characterized in that:

the dowels are stepped, each dowel having first and second portions, each dowel having at least two contiguous stepped dowel sections having sidewalls defining a different and decreasing cross-sectional size for each dowel section from a first dowel section to a last dowel section respectively;

the central, first and second flanking wall panels have a plurality of openings for receiving the dowels to fix the central, first and second flanking wall panels to the surface members, each opening extending inward into the attachment surfaces of the central, first and second flanking wall panels and aligned with at least one corresponding channel in the adjacent elongated longitudinal surface of the surface member;

the surface members have a plurality of channels for receiving the dowels to fix the surface members to the central, first and second flanking wall panels, each channel extending through the elongated longitudinal surfaces of the surface members and aligned with at least one corresponding opening in the adjacent attachment surface of the central, first and second flanking wall panels, the channels each having at least two contiguous channel sections from a first channel section to a last channel section, each channel section sequentially decreasing in cross-sectional size;

the central wall panel has at least one opening on one attachment surface, the opening extending inward at a first angle; the first and second flanking wall panels have at least one opening on one attachment surface, the opening extending at a transverse angle toward the central wall panel; and the first and second flanking wall panels have at least two openings on the other attachment surface, the openings, extending toward a central longitudinal axis of the central wall panel;

adhesive is disposed on the channels of the surface members and in the openings of the central, first and second flanking wall panels;

the dowels are pressed into the openings to connect the surface members and the central, first and second flanking wall panels;

the first channel section of the surface member comprises an alignment member; and the first dowel section comprises an orientation member;

wherein, when the dowel is aligned in the corresponding channel, the alignment member communicates with the orientation member.

5. The wall system of claim 4, the dowel comprising:
portions of a wood from a plurality of growth rings; and
a plurality of vertically-oriented layers, each layer comprising a portion of a growth ring; wherein each pair of adjacent growth ring layers comprises adjacent portions of adjacent growth rings;
wherein, when the dowel is exposed to moisture, the growth ring layers expand in a horizontally-oriented direction.

6. A substantially wooden wall system, the wall system comprising:
a central wall panel having:
an outward-facing surface having a top end, a bottom end, and opposing first and second sides;
first and second bores on the top end, the first and second top bores extending inward and toward a central longitudinal axis of the central wall panel;
a central bore on the bottom end, the central bottom bore extending inward and perpendicular from the bottom end; and
a first flanking wall panel and a second flanking wall panel located on the first and second sides of the central wall panel; each flanking wall panel including:
an outward-facing surface having top and bottom ends;
first and second bores on the top end, the first and second top bores extending inward and toward a central longitudinal axis of each flanking wall panel; and
third and fourth bores on the bottom end, the third and fourth bottom bores extending inward and toward a central longitudinal axis of the central wall panel;
a bottom surface member having:
a top surface and a bottom surface, the top surface for communicating with the bottom ends of the central, first and second flanking wall panels;
a central channel defining a passageway through the top and bottom surfaces, the central channel positioned for aligning with the central bore; and
pairs of transverse channels for aligning with the pairs of bottom bores, an end of each channel including an alignment member for communicating with an orientation member of a dowel;
a top surface member having:
a top surface and a bottom surface, the bottom surface for communicating with the bottom ends of the central, first and second flanking wall panels; and
pairs of transverse channels, each pair of transverse channels for aligning with the pairs of top bores, each angled channel defining a passageway through the top and bottom surfaces, and an end of each channel including an alignment member for communicating with the orientation member of a dowel; and
a plurality of dowels, each dowel having:
upper and lower portions of decreasing cross-sectional sizes; and
the orientation member located on the upper portion;
wherein the dowels are inserted into the channels for securing the central, first and second flanking wall panels and the surface members together in a predetermined orientation to form the wall system; and
wherein the dowels can be positioned in the channels so that the alignment members communicate with the orientation members.

7. The wall system of claim 6 wherein:
The dowel comprises portions of a plurality of growth rings, the wooden dowel comprising:
a base portion and a tip portion, the base portion including the orientation member; and
a plurality of vertically-oriented layers, each layer comprising a portion of a growth ring; wherein each pair of adjacent growth ring layers comprises adjacent portions of adjacent growth rings;
wherein, when the dowel is exposed to moisture, the growth ring layers expand in a horizontally-oriented direction.

* * * * *